US012105760B2

(12) United States Patent
Venugopala Reddy et al.

(10) Patent No.: US 12,105,760 B2
(45) Date of Patent: Oct. 1, 2024

(54) METHOD AND SYSTEM FOR AUTOMATED FEEDBACK MONITORING IN REAL-TIME

(71) Applicant: JPMorgan Chase Bank, N.A., New York, NY (US)

(72) Inventors: Manjunath Venugopala Reddy, Lewis Center, OH (US); Veena N Sindgi, East Brunswick, NJ (US); Jason Bocz, Hilliard, OH (US); Jessica Claire Duggan, New York, NY (US); Van Trinh Nguyen, Delaware, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 200 days.

(21) Appl. No.: 17/307,442

(22) Filed: May 4, 2021

(65) Prior Publication Data

US 2022/0358162 A1 Nov. 10, 2022

(51) Int. Cl.
*G06F 16/906* (2019.01)
*G06F 16/16* (2019.01)
*G06Q 30/016* (2023.01)

(52) U.S. Cl.
CPC .......... *G06F 16/906* (2019.01); *G06F 16/164* (2019.01); *G06Q 30/016* (2013.01)

(58) Field of Classification Search
CPC ........................ G06F 16/906; G06F 16/164
(Continued)

(56) References Cited

U.S. PATENT DOCUMENTS 7,552,041 B2 * 6/2009 Lee .................. G06F 16/23
703/13
8,225,407 B1 * 7/2012 Thrower ............. H04L 63/1441
726/25
(Continued)

FOREIGN PATENT DOCUMENTS

CN 1842811 A * 10/2006 ............ G06Q 10/06
WO WO-0074325 A1 * 12/2000 ............ H04L 41/06
(Continued)

OTHER PUBLICATIONS

Piero Molino et al., "COTA: Improving the Speed and Accuracy of Customer Support Through Ranking and Deep Networks," KDD' 18: Proceedings of the 24th ACM SIGKDD International Conference on Knowledge Discovery & Data Mining, Jul. 2018, pp. 586-595, <https://dl.acm.org/doi/10.1145/3219819.3219851>.

Primary Examiner — Tony Mahmoudi
Assistant Examiner — Michael Le
(74) Attorney, Agent, or Firm — GREENBLUM & BERNSTEIN, P.L.C.

(57) ABSTRACT

A method for providing automated customer feedback monitoring in real-time to facilitate identification and resolution of errors is disclosed. The method includes ingesting, via an application programming interface, data from a source, the data including feedback information from a customer; persisting the data in a file format, the file format including a tabular file format; filtering the persisted data based on a rating and a keyword; identifying a category for the filtered data based on a characteristic of the filtered data; determining whether a log file corresponds to the filtered data based on the identified category, the log file including an error log file that corresponds to an issue, and when the log file corresponds to the filtered data; correlating the filtered data
(Continued)

with the determined log file; and determining a priority level for the issue by using the correlated data and the log file.

16 Claims, 9 Drawing Sheets

(58) Field of Classification Search
USPC .......................................................... 707/738
See application file for complete search history.

(56) References Cited

U.S. PATENT DOCUMENTS

| | | | |
|---|---|---|---|
| 9,569,782 B1* | 2/2017 | Lavery | G06F 40/40 |
| 10,002,371 B1* | 6/2018 | Baker | G06F 16/24578 |
| 10,037,362 B1* | 7/2018 | Li | G06F 16/906 |
| 10,331,541 B2* | 6/2019 | Ledet | G06F 11/362 |
| 10,481,904 B1* | 11/2019 | Ledet | G06Q 10/101 |
| 10,529,030 B2* | 1/2020 | Kataria | G06Q 10/06398 |
| 11,176,464 B1* | 11/2021 | Sagi | G06N 7/005 |
| 11,422,880 B1* | 8/2022 | A | G06F 11/3688 |
| 11,556,843 B2* | 1/2023 | Backas | H04L 51/02 |
| 2006/0235822 A1* | 10/2006 | Raghavan | G06Q 10/10 |
| 2006/0294455 A1* | 12/2006 | Morris | G06F 40/169 |
| | | | 715/209 |
| 2008/0249764 A1* | 10/2008 | Huang | G06F 40/30 |
| | | | 704/9 |
| 2009/0089252 A1* | 4/2009 | Galitsky | G06F 16/245 |
| 2009/0327168 A1* | 12/2009 | Weinberger | H04L 51/212 |
| | | | 706/11 |
| 2011/0071950 A1* | 3/2011 | Ivanovic | G06Q 10/10 |
| | | | 705/304 |
| 2011/0083043 A1* | 4/2011 | Chan | G06F 11/0709 |
| | | | 714/E11.169 |
| 2013/0007527 A1* | 1/2013 | Petukhov | G06F 11/0793 |
| | | | 714/E11.029 |
| 2013/0059598 A1* | 3/2013 | Miyagi | H04W 4/023 |
| | | | 455/456.1 |
| 2013/0311836 A1* | 11/2013 | Hurst | G06F 21/577 |
| | | | 714/48 |
| 2014/0024348 A1* | 1/2014 | Hurst | G06Q 10/20 |
| | | | 455/414.1 |
| 2014/0025995 A1* | 1/2014 | Narayanan | G06F 11/0778 |
| | | | 714/E11.178 |
| 2014/0188665 A1* | 7/2014 | Baker | G06Q 30/0625 |
| | | | 705/26.62 |
| 2014/0195463 A1* | 7/2014 | Jacobs | G06Q 10/10 |
| | | | 706/50 |
| 2015/0120395 A1* | 4/2015 | Bellini, III | G06Q 10/0637 |
| | | | 705/7.36 |
| 2015/0147999 A1* | 5/2015 | Venezia | G06Q 30/016 |
| | | | 455/405 |
| 2015/0180746 A1* | 6/2015 | Day, II | H04L 67/55 |
| | | | 455/405 |
| 2016/0117383 A1* | 4/2016 | Patel | G06Q 50/01 |
| | | | 707/738 |
| 2016/0203571 A1* | 7/2016 | Besbah | G06Q 50/182 |
| | | | 705/309 |
| 2016/0225059 A1* | 8/2016 | Chow | G06Q 30/0282 |
| 2016/0342317 A1* | 11/2016 | Lim | G10L 15/1822 |
| 2017/0004205 A1* | 1/2017 | Jain | G06N 5/022 |
| 2017/0006135 A1* | 1/2017 | Siebel | G06Q 10/06 |
| 2017/0161243 A1* | 6/2017 | Manoraj | G06F 40/169 |
| 2017/0357501 A1* | 12/2017 | Ledet | G06F 8/33 |
| 2018/0060302 A1* | 3/2018 | Liang | G06F 16/35 |
| 2018/0173698 A1* | 6/2018 | Dubey | G06F 16/3347 |
| 2018/0247347 A1* | 8/2018 | McNabb | G06F 11/3055 |
| 2018/0285750 A1* | 10/2018 | Purushothaman | G06N 5/045 |
| 2018/0341885 A1* | 11/2018 | Kaulgud | G06Q 10/06393 |
| 2019/0026106 A1* | 1/2019 | Burton | G06F 8/71 |
| 2019/0163594 A1* | 5/2019 | Hayden | G06F 11/3024 |
| 2020/0021503 A1* | 1/2020 | de Lima | H04L 41/0896 |
| 2020/0293564 A1* | 9/2020 | Reh | G06F 16/906 |
| 2020/0342462 A1* | 10/2020 | Todd | G06F 40/211 |
| 2020/0344252 A1* | 10/2020 | Menon | G06F 11/3006 |
| 2020/0358902 A1* | 11/2020 | Gorny | H04M 3/5166 |
| 2020/0410997 A1* | 12/2020 | Bar-on | G10L 15/22 |
| 2021/0019767 A1* | 1/2021 | Bur | G06F 16/9035 |
| 2021/0091998 A1* | 3/2021 | Ellis | G06F 11/302 |
| 2021/0304142 A1* | 9/2021 | Bar-on | G06Q 10/101 |
| 2021/0312904 A1* | 10/2021 | Shukla | G06N 3/0445 |
| 2021/0406973 A1* | 12/2021 | Nahamani | G06F 40/205 |
| 2022/0038351 A1* | 2/2022 | Jasionowski | H04L 41/5019 |
| 2022/0237104 A1* | 7/2022 | Davis | G06F 11/3664 |
| 2022/0245647 A1* | 8/2022 | Dhawan | H04M 3/5183 |
| 2022/0318319 A1* | 10/2022 | Vishny | G06F 16/951 |

FOREIGN PATENT DOCUMENTS

| | | | | |
|---|---|---|---|---|
| WO | WO-2008083345 A2 * | 7/2008 | | G06N 5/02 |
| WO | WO-2019125546 A1 * | 6/2019 | | G06F 11/3664 |

* cited by examiner

METHOD AND SYSTEM FOR AUTOMATED FEEDBACK MONITORING IN REAL-TIME

BACKGROUND

1. Field of the Disclosure

This technology generally relates to methods and systems for feedback monitoring, and more particularly to methods and systems for providing automated monitoring of customer feedback from a variety of sources in real-time to facilitate identification and resolution of technology issues.

2. Background Information

Many business entities rely on feedback data to ascertain customer reactions to products and services that are associated with the business entities. The feedback data may be utilized as a basis for improving the products and services. Historically, implementation of conventional methodologies for obtaining and using the feedback data have resulted in varying degrees of success with respect to efficiency and utility.

One drawback of implementing conventional methodologies for obtaining and using the feedback data is that in many instances, the feedback data is in a natural language format such as, for example, an English language format. As a result, useful correlation of the feedback data with either a product or service is a manual process that is difficult to scale for large amounts of feedback data and even more difficult to perform in real-time. Additionally, advanced analytic features such as, for example, automated issue identification and alerting may not be feasible without large quantities of processed feedback data.

Therefore, there is a need to provide real-time, automated monitoring of customer feedback from a variety of different sources such as, for example, social media sources to facilitate identification and resolution of issues.

SUMMARY

The present disclosure, through one or more of its various aspects, embodiments, and/or specific features or sub-components, provides, inter glia, various systems, servers, devices, methods, media, programs, and platforms for providing automated monitoring of customer feedback from a variety of sources in real-time to facilitate identification and resolution of technology issues.

According to an aspect of the present disclosure, a method for providing automated customer feedback monitoring in real-time to facilitate identification and resolution of errors is disclosed. The method is implemented by at least one processor. The method may include ingesting, via an application programming interface, data from at least one source, the data may include feedback information from at least one customer; persisting the data in at least one file format, the at least one file format may include a tabular file format; filtering the persisted data based on at least one from among a rating and a keyword; identifying at least one category for the filtered data based on at least one characteristic of the filtered data; determining whether at least one log file corresponds to the filtered data based on the identified at least one category, the at least one log file may include at least one error log file that corresponds to an issue, and when the at least one log file corresponds to the filtered data; correlating the filtered data with the at least one determined log file; and determining a priority level for the issue by using the correlated data and the at least one log file.

In accordance with an exemplary embodiment, when the at least one log file does not correspond to the filtered data, the method may further include tagging the filtered data; determining whether the tagged data corresponds to at least one known issue by using a database exclusion table, and when the tagged data does not correspond to the at least one known issue; generating at least one new issue tracking ticket for the tagged data, the at least one new issue tracking ticket may correspond to a new issue; associating the tagged data with the at least one new issue tracking ticket; and determining a new priority level for the new issue by using the tagged data.

In accordance with an exemplary embodiment, the at least one issue tracking ticket may include at least one from among a data label, an assigned owner, a title, and a description, the description may include information that relates to at least one from among a customer, a customer comment, a rating, a timestamp, a device, a browser, a related exception, and a corresponding query.

In accordance with an exemplary embodiment, for the ingesting, the method may further include initiating at least one call to the at least one source via the application programming interface; receiving the data from the at least one source in response to the at least one call; sanitizing the received data by removing at least one from among special character information and personal information; and standardizing the sanitized data by converting a time that is associated with the sanitized data to a coordinated universal time format.

In accordance with an exemplary embodiment, for the filtering, the method may further include parsing the persisted data to identify at least one linguistic element; determining the keyword by matching the identified at least one linguistic element with at least one predetermined keyword set; and determining the rating based on the identified at least one linguistic element, the rating may include a level of severity that corresponds to the feedback information.

In accordance with an exemplary embodiment, for the identifying, the method may further include assigning at least one label that corresponds to the at least one category to the filtered data; and apportioning the filtered data to a support resource identifier based on the assigned at least one label.

In accordance with an exemplary embodiment, the at least one log file may include at least one from among a crash log file and an authentication log file.

In accordance with an exemplary embodiment, for the determining of the priority level, the method may further include identifying at least one service name that corresponds to the issue; calculating a failure rate for at least one service that is associated with the at least one service name based on the correlated data and the at least one log file that corresponds to the issue; calculating a customer impact count for the at least one service that is associated with the at least one service name based on the correlated data and the at least one log file that corresponds to the issue; determining whether the calculated failure rate is above a predetermined threshold; and assigning the priority level to the issue based on a result of the determining and the calculated customer impact count.

In accordance with an exemplary embodiment, the priority level may include at least one from among a high priority level and a critical priority level, the high priority level may correspond to a determination that the calculated failure rate is between five percent and ten percent, and the critical priority level may correspond to the determination that the calculated failure rate is more than ten percent.

In accordance with an exemplary embodiment, the method may further include updating at least one issue tracking ticket that corresponds to the issue with information that relates to the at least one service name, the calculated failure rate, and the calculated customer impact count; and linking the at least one issue tracking ticket with another issue tracking ticket based on the information.

According to an aspect of the present disclosure, a computing device configured to implement an execution of a method for providing automated customer feedback monitoring in real-time to facilitate identification and resolution of errors is disclosed. The computing device comprising a processor; a memory; and a communication interface coupled to each of the processor and the memory, wherein the processor may be configured to ingest, via an application programming interface, data from at least one source, the data may include feedback information from at least one customer; persist the data in at least one file format, the at least one file format may include a tabular file format; filter the persisted data based on at least one from among a rating and a keyword; identify at least one category for the filtered data based on at least one characteristic of the filtered data; determine whether at least one log file corresponds to the filtered data based on the identified at least one category, the at least one log file may include at least one error log file that corresponds to an issue, and when the at least one log file corresponds to the filtered data; correlate the filtered data with the at least one determined log file; and determine a priority level for the issue by using the correlated data and the at least one log file.

In accordance with an exemplary embodiment, when the at least one log file does not correspond to the filtered data, the processor may be further configured to tag the filtered data; determine whether the tagged data corresponds to at least one known issue by using a database exclusion table, and when the tagged data does not correspond to the at least one known issue; generate at least one new issue tracking ticket for the tagged data, the at least one new issue tracking ticket may correspond to a new issue; associate the tagged data with the at least one new issue tracking ticket; and determine a new priority level for the new issue by using the tagged data.

In accordance with an exemplary embodiment, the at least one issue tracking ticket may include at least one from among a data label, an assigned owner, a title, and a description, the description may include information that relates to at least one from among a customer, a customer comment, a rating, a timestamp, a device, a browser, a related exception, and a corresponding query.

In accordance with an exemplary embodiment, for the ingesting, the processor may be further configured to initiate at least one call to the at least one source via the application programming interface; receive the data from the at least one source in response to the at least one call; sanitize the received data by removing at least one from among special character information and personal information; and standardize the sanitized data by converting a time that is associated with the sanitized data to a coordinated universal time format.

In accordance with an exemplary embodiment, for the filtering, the processor may be further configured to parse the persisted data to identify at least one linguistic element; determine the keyword by matching the identified at least one linguistic element with at least one predetermined keyword set; and determine the rating based on the identified at least one linguistic element, the rating may include a level of severity that corresponds to the feedback information.

In accordance with an exemplary embodiment, for the identifying, the processor may be further configured to assign at least one label that corresponds to the at least one category to the filtered data; and apportion the filtered data to a support resource identifier based on the assigned at least one label.

In accordance with an exemplary embodiment, the at least one log file may include at least one from among a crash log file and an authentication log file.

In accordance with an exemplary embodiment, for the determining of the priority level, the processor may be further configured to identify at least one service name that corresponds to the issue; calculate a failure rate for at least one service that is associated with the at least one service name based on the correlated data and the at least one log file that corresponds to the issue; calculate a customer impact count for the at least one service that is associated with the at least one service name based on the correlated data and the at least one log file that corresponds to the issue; determine whether the calculated failure rate is above a predetermined threshold; and assign the priority level to the issue based on a result of the determining and the calculated customer impact count.

In accordance with an exemplary embodiment, the priority level may include at least one from among a high priority level and a critical priority level, the high priority level may correspond to a determination that the calculated failure rate is between five percent and ten percent, and the critical priority level may correspond to the determination that the calculated failure rate is more than ten percent.

In accordance with an exemplary embodiment, the processor may be further configured to update at least one issue tracking ticket that corresponds to the issue with information that relates to the at least one service name, the calculated failure rate, and the calculated customer impact count; and link the at least one issue tracking ticket with another issue tracking ticket based on the information.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
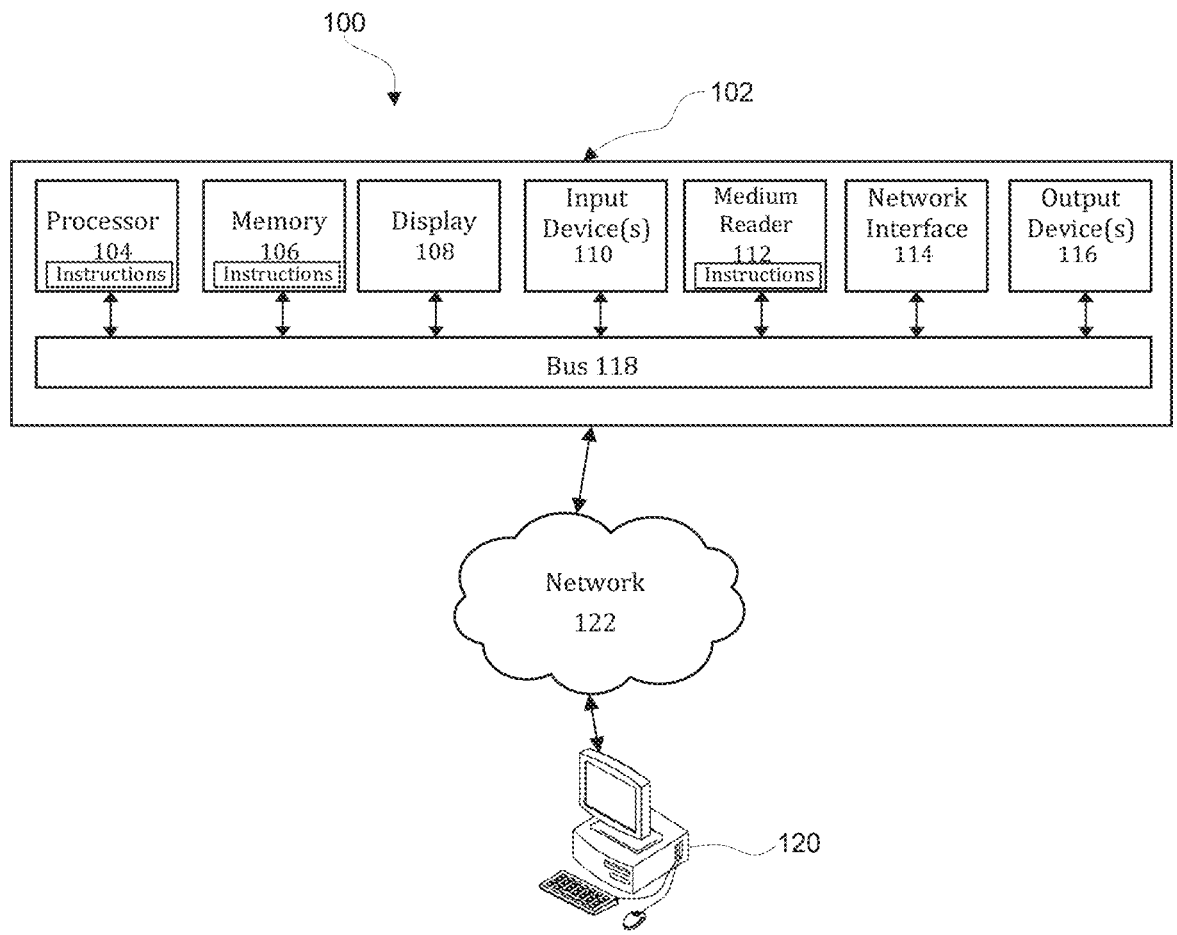
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing automated monitoring of customer feedback from a variety of sources in real-time to facilitate identification and resolution of technology issues.

Figure 2:
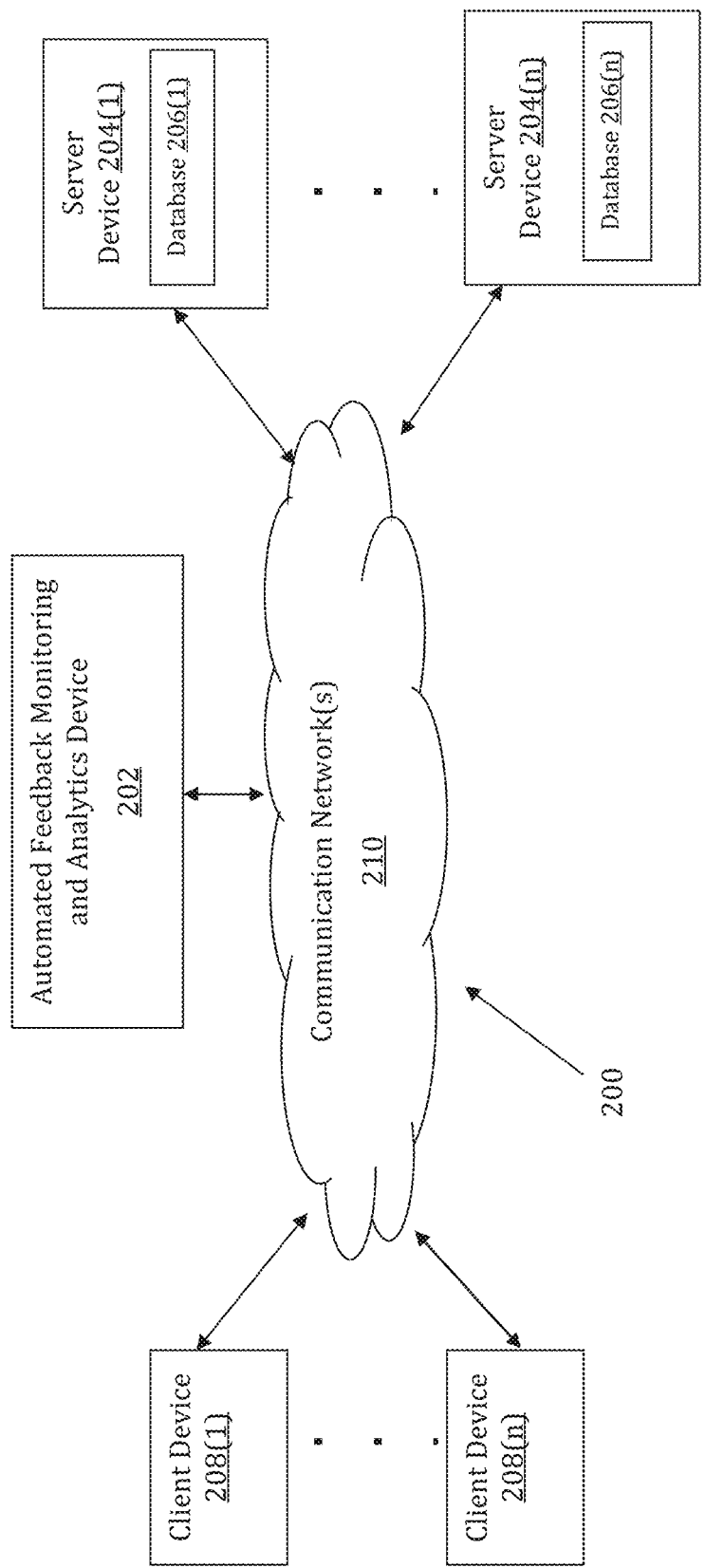
FIG. 2 illustrates an exemplary diagram of a network environment.

Referring to FIG. 2, a schematic of an exemplary network environment 200 for implementing a method for providing automated monitoring of customer feedback from a variety of sources in real-time to facilitate identification and resolution of technology issues is illustrated. In an exemplary embodiment, the method is executable on any networked computer platform, such as, for example, a personal computer (PC).

The method for providing automated monitoring of customer feedback from a variety of sources in real-time to facilitate identification and resolution of technology issues may be implemented by an Automated Feedback Monitoring and Analytics (AFMA) device 202. The AFMA device 202 may be the same or similar to the computer system 102 as described with respect to FIG. 1. The AFMA device 202 may store one or more applications that can include executable instructions that, when executed by the AFMA device 202, cause the AFMA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AFMA device 202 itself, may be located in virtual server(s) running in a cloud-based computing environment rather than being tied to one or more specific physical network computing devices. Also, the application(s) may be running in one or more virtual machines (VMs) executing on the AFMA device 202. Additionally, in one or more embodiments of this technology, virtual machine(s) running on the AFMA device 202 may be managed or supervised by a hypervisor.

In the network environment 200 of FIG. 2, the AFMA device 202 is coupled to a plurality of server devices 204(1)-204(n) that hosts a plurality of databases 206(1)-206(n), and also to a plurality of client devices 208(1)-208(n) via communication network(s) 210. A communication interface of the AFMA device 202, such as the network interface 114 of the computer system 102 of FIG. 1, operatively couples and communicates between the AFMA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AFMA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and AFMA devices that efficiently implement a method for providing automated monitoring of customer feedback from a variety of sources in real-time to facilitate identification and resolution of technology issues.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable fort g voice, modem, and the like), Public Switched Telephone Network (PSTNs), Ethernet-based Packet Data Networks (PDNs), combinations thereof, and the like.

The AFMA device 202 may be a standalone device or integrated with one or more other devices or apparatuses, such as one or more of the server devices 204(1)-204(n), for example. In one particular example, the AFMA device 202 may include or be hosted by one of the server devices 204(1)-204(n), and other arrangements are also possible. Moreover, one or more of the devices of the AFMA device 202 may be in a same or a different communication network including one or more public, private, or cloud networks, for example.

The plurality of server devices 204(1)-204(n) tray be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the AFMA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data such as, for example, raw data, feedback data, customer data, rating data, keyword data, log file data, issue tracking ticket data, priority level data, and label data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the AFMA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the AFMA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the AFMA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AFMA device 202, the server devices 204(1)-204(n), or the client devices 208(1)-208(n), for example, may be configured to operate as virtual instances on the same physical machine. In other words, one or more of the AFMA device 202, the server devices 204(1)-204(n), or the client devices 208(1)-208(n) may operate on the same physical device rather than as separate devices communicating through communication network(s)

210. Additionally, there may be more or fewer AFMA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
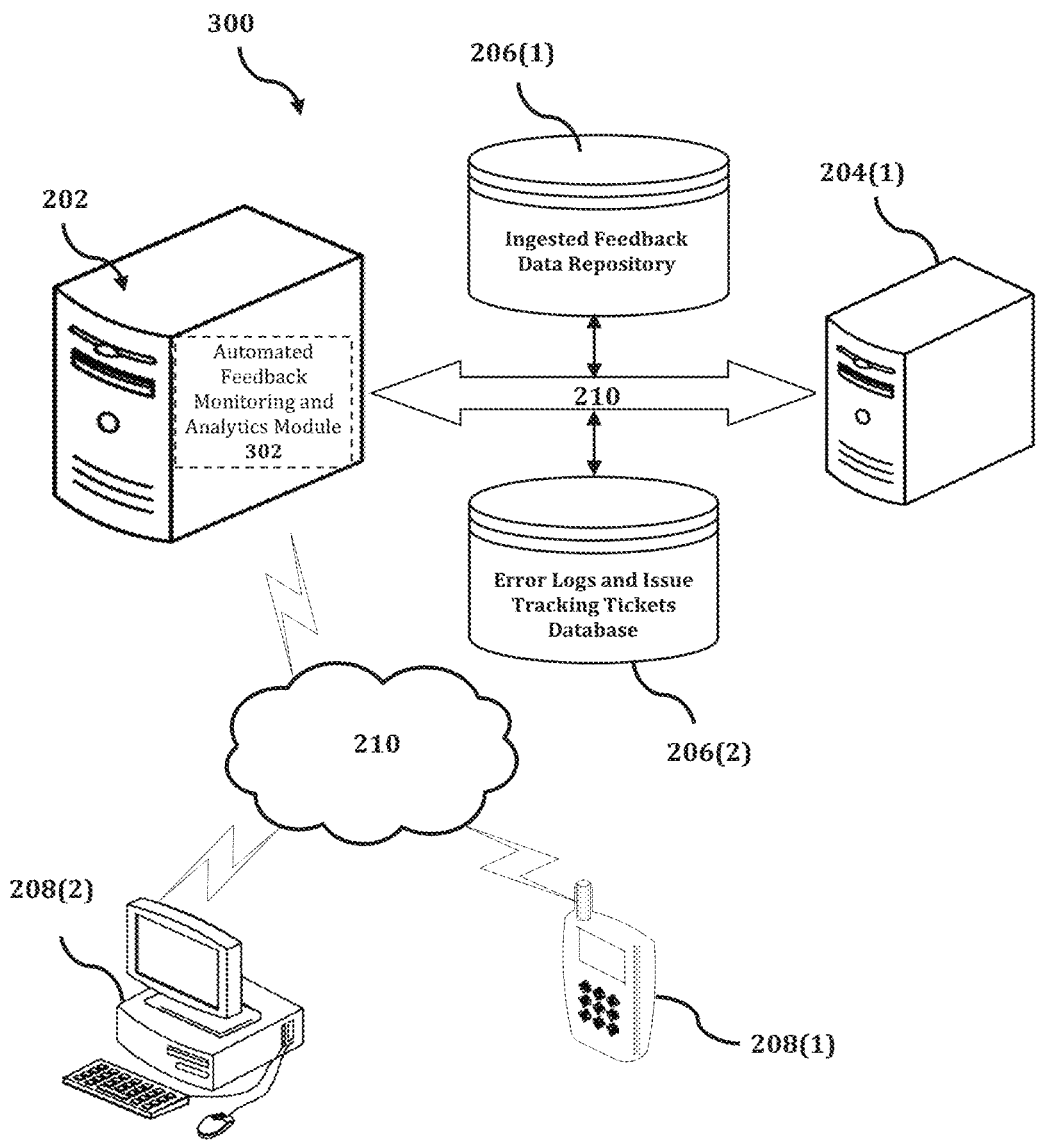
FIG. 3 shows an exemplary system for implementing a method for providing automated monitoring of customer feedback from a variety of sources in real-time to facilitate identification and resolution of technology issues.

The AFMA device 202 is described and shown in FIG. 3 as including an automated feedback monitoring and analytics module 302, although it may include other rules, policies, modules, databases, or applications, for example. As will be described below, the automated feedback monitoring and analytics module 302 is configured to implement a method for providing automated monitoring of customer feedback from a variety of sources in real-time to facilitate identification and resolution of technology issues.

An exemplary process 300 for implementing a mechanism for providing automated monitoring of customer feedback from a variety of sources in real-time to facilitate identification and resolution of technology issues by utilizing the network environment of FIG. 2 is shown as being executed in FIG. 3. Specifically, a first client device 208(1) and a second client device 208(2) are illustrated as being in communication with AFMA device 202. In this regard, the first client device 208(1) and the second client device 208(2) may be "clients" of the AFMA device 202 and are described herein as such. Nevertheless, it is to be known and understood that the first client device 208(1) and/or the second client device 208(2) need not necessarily be "clients" of the AFMA device 202, or any entity described in association therewith herein. Any additional or alternative relationship may exist between either or both of the first client device 208(1) and the second client device 208(2) and the AFMA device 202, or no relationship may exist.

Further, AFMA device 202 is illustrated as being able to access an ingested feedback data repository 206(1) and an error logs and issue tracking tickets database 206(2). The automated feedback monitoring and analytics module 302 may be configured to access these databases for implementing a method for providing automated monitoring of customer feedback from a variety of sources in real-time to facilitate identification and resolution of technology issues.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the AFMA device 202 via broadband or cellular communication. Of course, these embodiments are merely exemplary and are not limiting or exhaustive.

Upon being started, the automated feedback monitoring and analytics module 302 executes a process for providing automated monitoring of customer feedback from a variety of sources in real-time to facilitate identification and resolution of technology issues. An exemplary process for providing automated monitoring of customer feedback from a variety of sources in real-time to facilitate identification and resolution of technology issues is generally indicated at flowcharts 400A and 400B in FIGS. 4A and 4B.

Figure 4A:
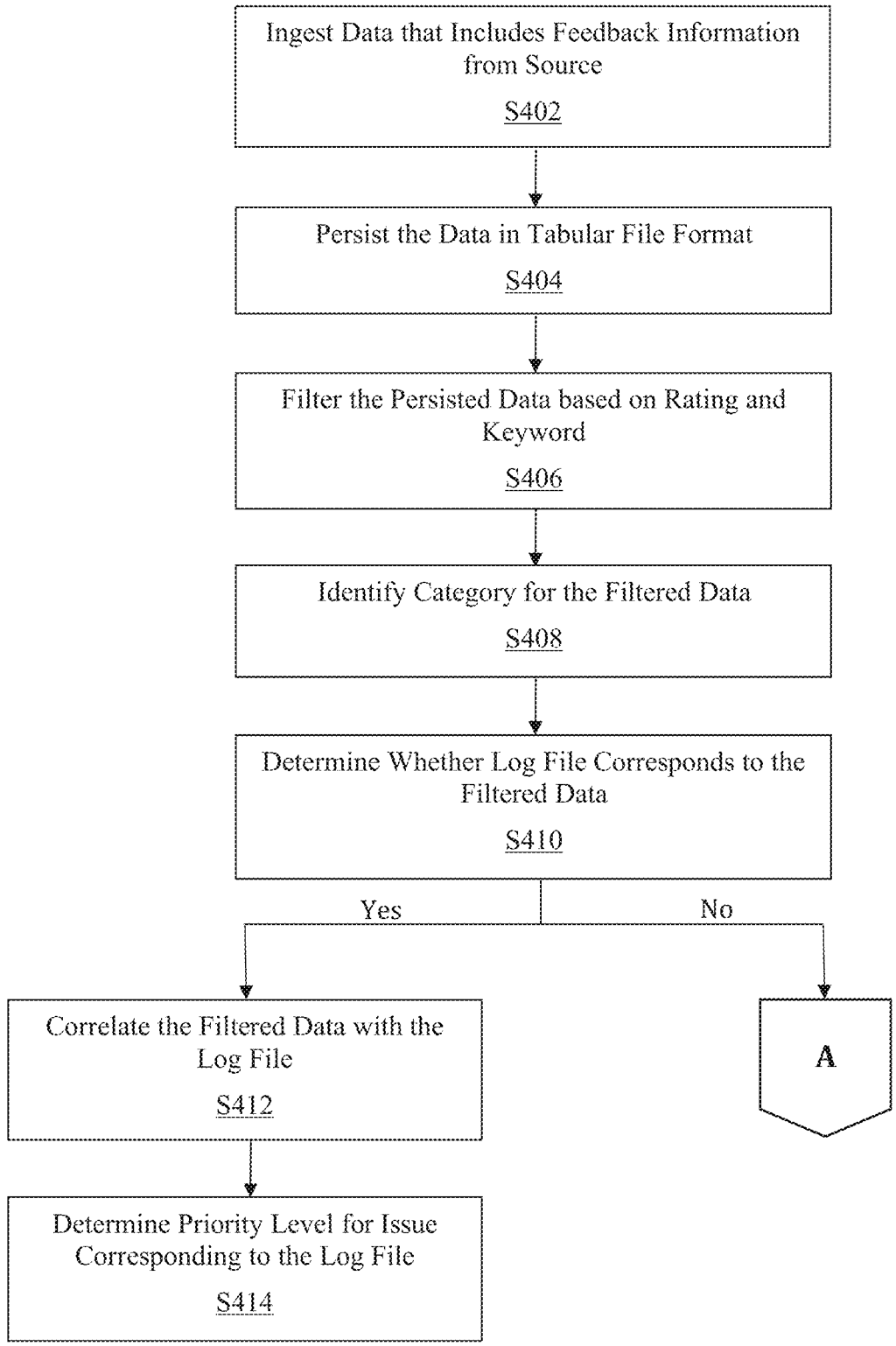
FIG. 4A is a flowchart of an exemplary process for implementing a method for providing automated monitoring of customer feedback from a variety of sources in real-time to facilitate identification and resolution of technology issues.

In the process 400A of FIG. 4A, at step S402, data may be ingested from a variety of sources via an application programming interface (API). The data may include feedback information from a customer. In an exemplary embodiment, the feedback information may include information that relates to a customer reaction to a product and/or service. For example, the feedback information may include a customer rating of the product and/or service, a customer service request relating to the product and/or service, and a social media complaint relating to the product and/or service. In another exemplary embodiment, the feedback data may include at least one from among attributable data and nonattributable data. The attributable data may include customer identifiers such as, for example, a unique customer profile identifier that may be used to correlate the feedback information to a specific customer. The nonattributable data may include anonymized data that does not include the customer identifiers.

In another exemplary embodiment, the sources may include first party sources such as, for example, a first party mobile application, a first party website, and a first party customer support platform as well as third-party sources such as, for example, a third-party application store, a third-party software application, and a third-party social media platform. The third-party social media platform may include interactive, digitally mediated technologies that facilitate the creation and/or sharing of information, ideas, and other forms of expression via virtual communities and networks.

In another exemplary embodiment, the API may include an interface that defines interactions between multiple software applications and/or mixed hardware-software intermediaries. The API may define the kinds of calls and/or requests that can be made, how to make them, the data formats that should be used, and the conventions to follow. In another exemplary embodiment, the API may be utilized to ingest the feedback information in real-time. For example, the API may facilitate the ingestion of the feedback information in real-time when a customer publishes the feedback information on a social media platform such as TWITTER and DOWNDETECTOR. The API may also facilitate the ingestion of the feedback information in real-time from an application store such as, for example, an APPLE IOS APP STORE and a GOOGLE PLAYSTORE as well as from first party customers that are internal to an entity such as, for example, employees of the entity.

In another exemplary embodiment, the ingesting of the feedback information may include initiating a call to the sources via the application programming interface. The feedback information may be received from the sources in response to the call. The feedback information may then be sanitized to remove information that relates to at least one from among special character information and personal information. In another exemplary embodiment, a predetermined guideline from the operating entity may determine the information to be removed. Additionally, the sanitized feedback information may be standardized by converting a time that is associated with the sanitized feedback information into a coordinated universal time format.

In another exemplary embodiment, the ingesting of the feedback information may be requested by a user via a graphical user interface. For example, a service representative may request the ingesting of the feedback data for an application in response to customer inquiries relating to a corresponding application error. The service representative may do so to determine whether the error is an isolated occurrence or a system wide failure. In another exemplary embodiment, the ingesting of the feedback information may be accomplished automatically based on a predetermined preference. For example, the feedback information for a business-critical component may be ingested in real-time based on a publication of the feedback information at the source.

At step S404, the ingested data may be persisted in a networked repository. The ingested data may be persisted in a file format that includes a tabular file format. For example, the ingested data may be persisted as a comma-separated values (CSV) file corresponding to a delimited text file that uses a comma to separate each of the values. The CSV file may store numbers and/or texts in plain text such that each line may have the same number of fields. The plain text may relate to data that represent only characters of readable material but not corresponding graphical representation. As will be appreciated by a person of ordinary skill in the art, the CSV file may correspond to any delimiter-separated file formats that use other field delimiters such as, for example, semicolons.

In another exemplary embodiment, the persisted data may be enriched with corresponding information such as, for example, keyword information, categorization information, and label information. The persisted data may be joined with historical feedback data based on a corresponding customer and/or a corresponding sentiment. In another exemplary embodiment, the historical feedback data may be retrieved from first party networked repositories as well as third-party networked repositories. As will be appreciated by a person of ordinary skill in the art, the enrichment of data in a tabular file format may include the addition and subtraction of information within various rows and columns as well as the addition and the subtraction of the rows and columns.

At step S406, the persisted data may be filtered based on at least one from among a rating and a keyword. The filtering may narrow down the volume of customer feedback to a specific sub-set targeting system issues. In an exemplary embodiment, the filtering may correspond to a process whereby the persisted data is parsed to identify linguistic elements. The keyword may be determined by matching the identified linguistic elements with a predetermined keyword set. For example, each customer comment may be parsed and matched against the predetermined keyword set. The rating may also be determined based on the identified linguistic element. For example, a higher rating may be assigned to the customer then the corresponding customer comment includes specific words which indicates that the customer is in an aggravated state of mind. In another exemplary embodiment, the rating may include a level of severity that corresponds to the feedback information.

At step S408, a category for the filtered data may be identified based on a characteristic of the filtered data. The characteristic of the filtered data may relate to a shared context of the filtered data that facilitates grouping actions. In an exemplary embodiment, the categories for the filtered data may include a product grouping, a sub-product grouping, and a theme grouping. For example, filtered data relating to a payment product may be grouped together in the payment product category. In an exemplary embodiment, the identifying may correspond to a process whereby a label that corresponds to the category may be assigned to the filtered data. The filtered data may then be apportioned to a support resource identifier based on the assigned label.

At step S410, whether a log file corresponds to the filtered data may be determined based on the identified category. For example, the filtered data that has been associated with a crash category may be correlated to compiled logs that contain a product and/or service crash information. Similarly, the filtered data that has been associated with a login category may be correlated to compiled logs that contain authentication information. In an exemplary embodiment, attributable information such as, for example, customer profile information may be utilized together with the identified category to determine a corresponding log file. For example, the filtered data for a group of users in a specific geographic location that has been associated with a crash category may be correlated to compiled logs that contain a product and/or service crash information for that specific geographic location.

In another exemplary embodiment, the log file may include an error log file that corresponds to an issue. The log file may relate to a computer file that records either events that occur in a computing environment and/or messages between different components within the computing environment. The log file may include at least one from among a crash log file and an authentication log file. In another exemplary embodiment, the log file may include a computer-generated data file that contains information about usage patterns, activities, and operations within an operating system, application, server, and/or another device. As will be appreciated by a person of ordinary skill in the art, the log files may correspond to a primary data source for network observability.

At step S412, when the log file corresponds to the filtered data, the filtered data may be correlated with the log file. In an exemplary embodiment, an association between the filtered data and the log file may be stored in a networked repository as well as together with the filtered data. For example, the association between the filtered data and the log file may be stored in metadata that corresponds to the filtered data.

At step S414, a priority level for the issue associated with the log file may be determined by using the correlated data and the log file. In an exemplary embodiment, the determining of the priority level for the issue may include a process whereby a service name that corresponds to the issue may be identified. A failure rate for a service that is associated with the identified service name may then be calculated based on the correlated data and the log file. In another exemplary embodiment, time correlated failure rates for the service that is associated with the identified service name may be calculated by reviewing the log file for a period of time such as, for example, a twenty-four-hour period of time and then comparing the observed failure rates to failure rates from a corresponding history of failure rates such as, for example, failure rates from the prior seven days.

Similarly, a customer impact count for the service that is associated with the identified service name may also be calculated based on the correlated data and the log file. For example, a customer impact count may include information indicating that over one thousand customers are affected by a particular crash issue. In another exemplary embodiment, whether the calculated failure rate is above a predetermined threshold may be determined. Then, a priority level may be assigned to the corresponding issue based on a result of the determining and the calculated customer impact count.

In another exemplary embodiment, an issue tracking ticket that corresponds to the issue may be updated with information that relates to the service name, the calculated failure rate, and the calculated customer impact count. The issue tracking ticket may be linked with another issue tracking ticket based on the updated information. In another exemplary embodiment, the issue tracking ticket may include at least one from among a data label, an assigned owner, a title, and a description. The issue tracking ticket may facilitate bug tracking and agile project management by a first party issue tracking product as well as by a third-party issue tracking product such as, for example, a JIRA issue tracking product. In another exemplary embodiment, the description may include information that relates to at least one from among a customer, a customer comment, a rating, a timestamp, a device, a browser, a related exception, and a corresponding query.

In another exemplary embodiment, the priority level may include at least one from among a high priority level and a critical priority level. The high priority level may correspond to a determination that the calculated failure rate for the issue is between five percent and ten percent. The critical priority level may correspond to a determination that the calculated failure rate for the issue is more than ten percent.

In another exemplary embodiment, the filtered data together with the log file and the priority level may be automatically delivered to an appropriate component for resolution processing. The appropriate component may be determined based on the determined priority level. For example, when a determination is made that the issue has a critical priority level, the issue may be escalated for resolution processing by delivering the filtered data together with the log file and priority level information to a support specialist. In another exemplary embodiment, the appropriate component may be automatically identified based on the filtered data and the log file to determine. For example, when a determination is made that the issue is related to a service crash, the issue may be escalated for resolution processing by delivering the filtered data together with the log file and priority level information to a crash resolution component. In another exemplary embodiment, the appropriate component may correspond to a reporting component that compiles information for system documentation and auditing.

In another exemplary embodiment, resolution processing may be accomplished automatically via a model based on the filtered data together with the log file and the priority level. The model may include at least one from among a machine learning model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges. In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

Figure 4B:
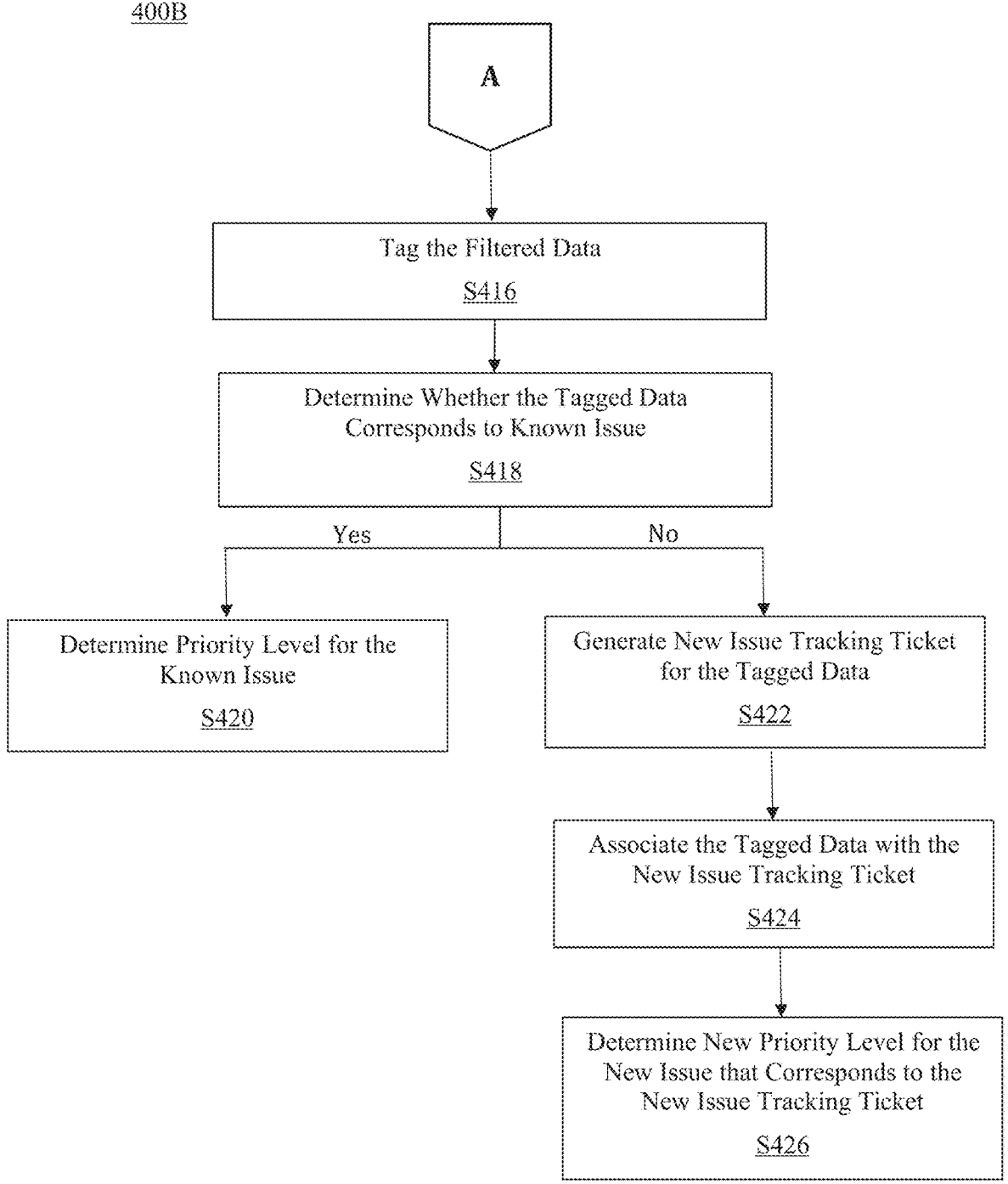
FIG. 4B is a flowchart of an exemplary process for implementing a method for providing automated monitoring of customer feedback from a variety of sources in real-time to facilitate identification and resolution of technology issues.

In the process 400B of FIG. 4B, at step S416, the filtered data may be tagged when the log file does not correspond to the filtered data. The tag may indicate that an existing issue tracking ticket does not exist for the associated issue. Then, at step S418, whether the tagged data corresponds to a known issue may be determined by using a database exclusion table. Consistent with disclosures in the present application, characteristics of the tagged data may be compared to the known issue to determine is the known issue is related to the tagged data.

At step S420, a priority level for the known issue may be determined when the tagged data corresponds to the known issue. In an exemplary embodiment, the determining of the priority level for the known issue may include a process whereby a service name that corresponds to the known issue may be identified. A failure rate for a service that is associated with the identified service name may then be calculated based on the tagged data. In another exemplary embodiment, time correlated failure rates for the service that is associated with the identified service name may be calculated by reviewing the tagged data for a period of time such as, for example, a twenty-four-hour period of time and then comparing the observed failure rates to failure rates from a corresponding history of failure rates such as, for example, failure rates from the prior seven days.

Similarly, a customer impact count for the service that is associated with the identified service name may also be calculated based on the tagged data. For example, a customer impact count may include information indicating that over one thousand customers are affected by a known crash issue. In another exemplary embodiment, whether the calculated failure rate is above a predetermined threshold may be determined. Then, a priority level may be assigned to the corresponding known issue based on a result of the determining and the calculated customer impact count.

In another exemplary embodiment, the priority level may include at least one from among a high priority level and a critical priority level. The high priority level may correspond to a determination that the calculated failure rate for the known issue is between five percent and ten percent. The critical priority level may correspond to a determination that the calculated failure rate for the known issue is more than ten percent.

At step S422, a new issue tracking ticket for the tagged data may be generated when the tagged data does not correspond to a known issue. The new issue tracking ticket may correspond to a new issue in the tagged data. In an exemplary embodiment, the new issue tracking ticket that corresponds to the new issue may be updated with information that relates to the service name, the calculated failure rate, and the calculated customer impact count. The new issue tracking ticket may be linked with another issue tracking ticket based on the updated information. In another exemplary embodiment, the new issue tracking ticket may include at least one from among a data label, an assigned owner, a title, and a description. The new issue tracking ticket may facilitate bug tracking and agile project management by a first party issue tracking product as well as by a third-party issue tracking product such as, for example, a JIRA issue tracking product. In another exemplary embodiment, the description may include information that relates to at least one from among a customer, a customer comment, a rating, a timestamp, a device, a browser, a related exception, and a corresponding query.

At step S424, the tagged data may be associated with the new issue tracking ticket. In an exemplary embodiment, an association between the new issue tracking ticket and the tagged data may be stored in a networked repository as well as together with the tagged data. For example, the association between the new issue tracking ticket and the tagged data may be stored in metadata that corresponds to the tagged data.

At step S426, a new priority level for the new issue may be determined by using the tagged data. In an exemplary embodiment, the determining of the new priority level for the new issue may include a process whereby a service name that corresponds to the new issue may be identified. A failure rate for a service that is associated with the identified service name may then be calculated based on the tagged data. In another exemplary embodiment, time correlated failure rates for the service that is associated with the identified service name may be calculated by reviewing the tagged data for a period of time such as, for example, a twenty-four-hour period of time and then comparing the observed failure rates to failure rates from a corresponding history of failure rates such as, for example, failure rates from the prior seven days.

Similarly, a customer impact count for the service that is associated with the identified service name may also be calculated based on the tagged data. For example, a customer impact count may include information indicating that over one thousand customers are affected by a new crash issue. In another exemplary embodiment, whether the calculated failure rate is above a predetermined threshold may be determined. Then, a new priority level may be assigned to the corresponding new issue based on a result of the determining and the calculated customer impact count.

In another exemplary embodiment, the new priority level may include at least one from among a high priority level and a critical priority level. The high priority level may correspond to a determination that the calculated failure rate for the new issue is between five percent and ten percent. The critical priority level may correspond to a determination that the calculated failure rate for the new issue is more than ten percent.

Figure 5:
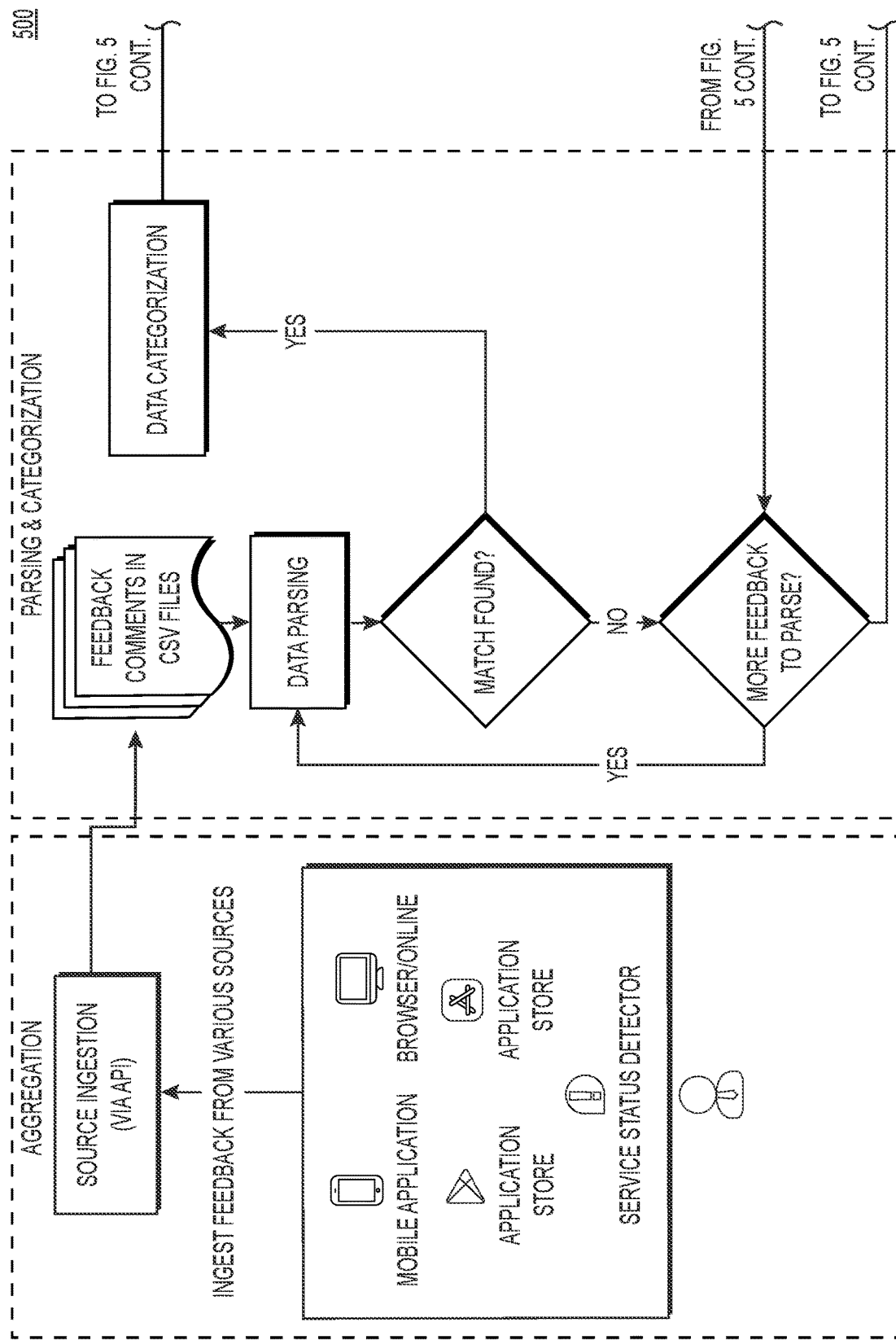
FIG. 5 is a flowchart of an exemplary automation architecture for implementing a method for providing automated monitoring of customer feedback from a variety of sources in real-time to facilitate identification and resolution of technology issues.
Figure 5:
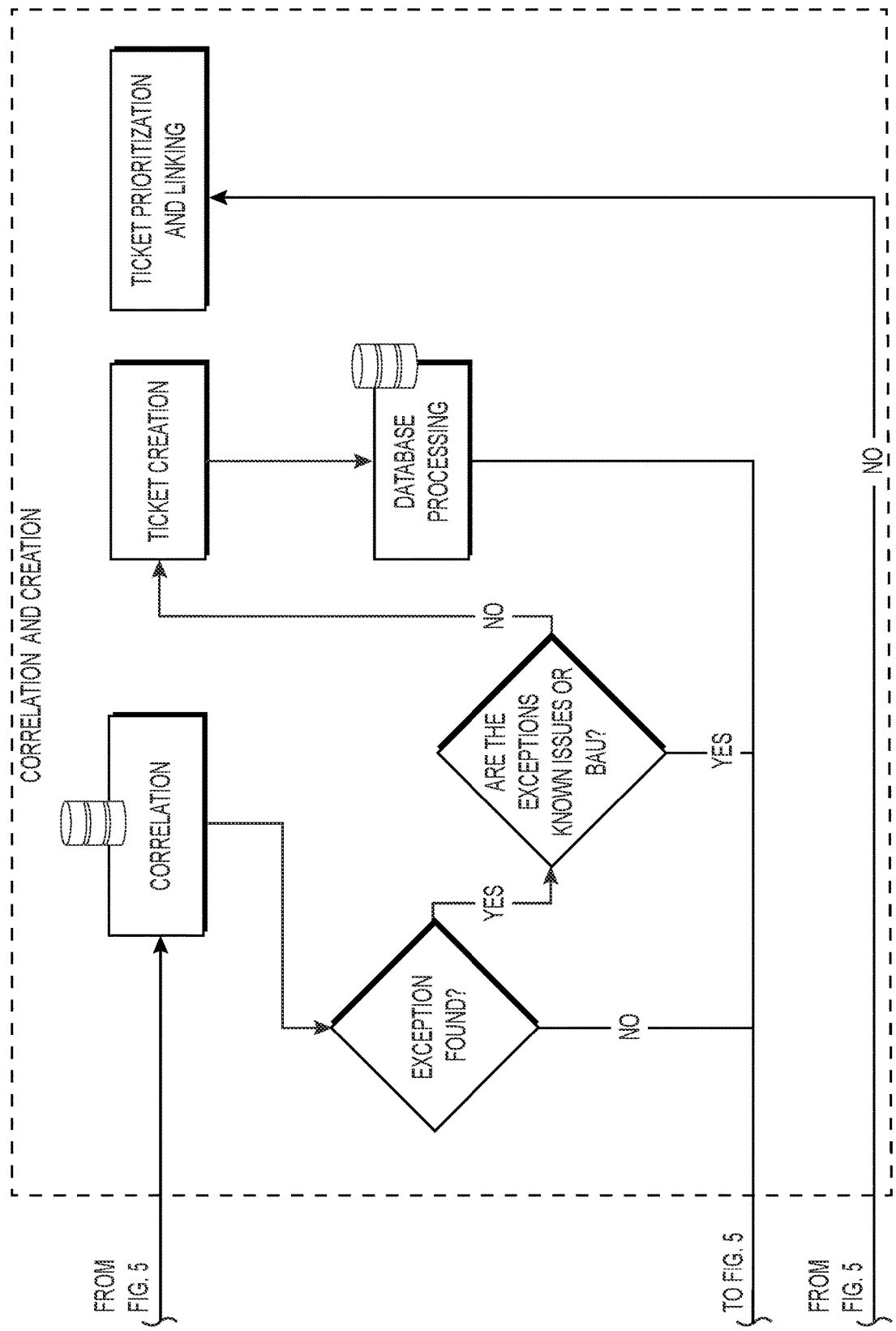

FIG. 5 is a flowchart 500 of an exemplary automation architecture for implementing a method for providing automated monitoring of customer feedback from a variety of sources in real-time to facilitate identification and resolution of technology issues. In FIG. 5, data processing steps may include an aggregation step, a parsing and categorizing step, as well as a correlation and creation step.

As illustrated in FIG. 5, the aggregation step may include the ingesting of feedback data from various sources such as, for example, a mobile application source, a browser/online source, an application store source, and a service status detector source. The ingested data is then passed to the parsing and categorization step. In the parsing and categorizing step, the feedback comments in the ingested feedback data may be persisted in CSV files. The persisted feedback data may be parsed to determine matching keywords. When a match is not found, additional processing to identify additional feedback data may be required.

When a keyword match is found, the feedback data may be categorized and passed to a correlation component of the correlation and creation step. The correlation component may associate the feedback data with an error log file as well as determine whether an exception is found. When an exception is not found, the associated feedback data may be passed to a ticket prioritizing and linking component for processing consistent with disclosures in the present application. However, when an exception is found, a determination may be made as to whether the exceptions correspond to a known issue. When a known issue does not exist, a new ticket may be created for the feedback data by the ticket creation component. Then, the feedback data may be further processed consistent with disclosures in the present application by a database processing component which may pass the processed feedback data to the ticket prioritizing and linking component.

Figure 6:
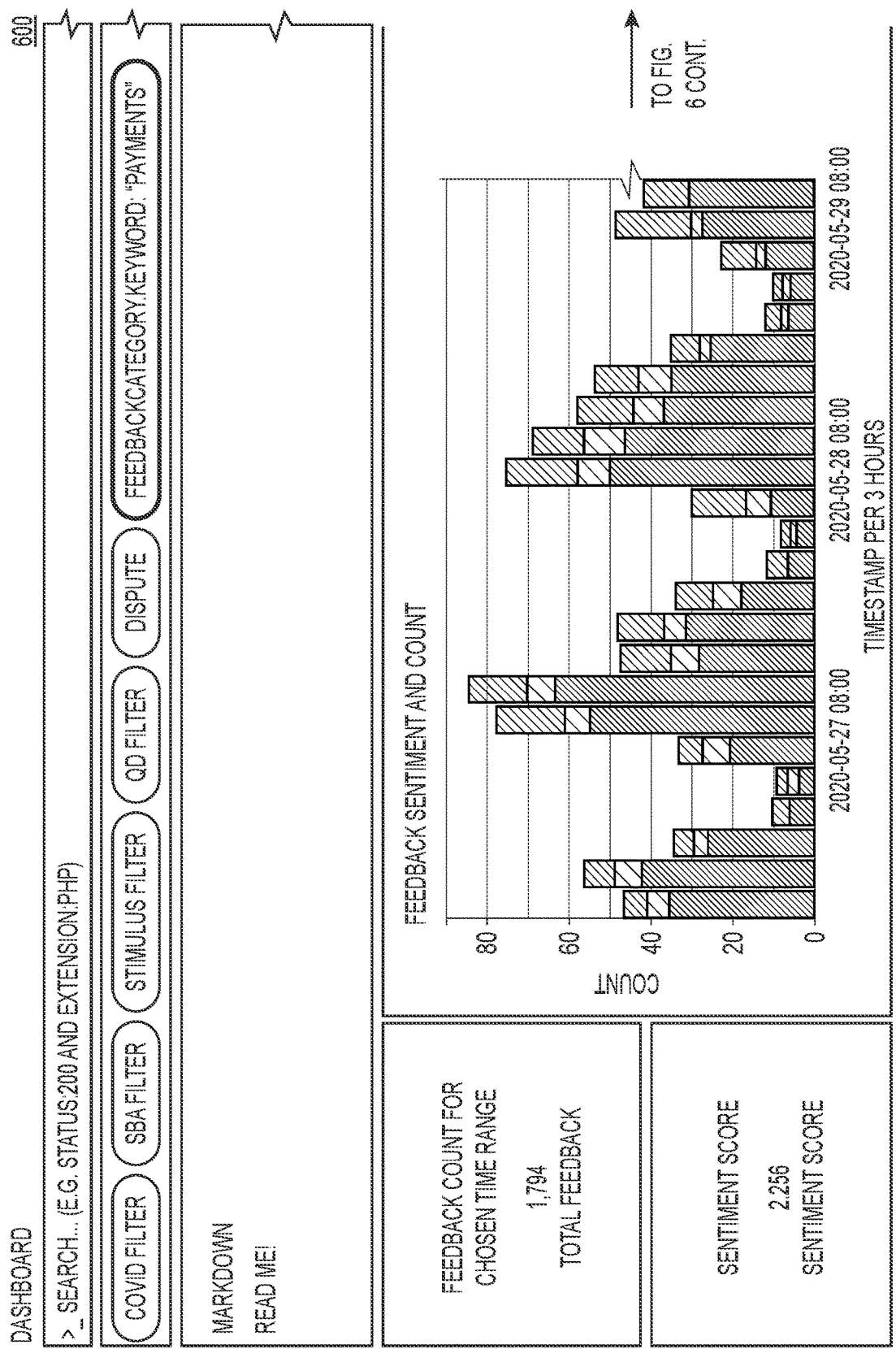
FIG. 6 is a screen shot that illustrates a dashboard graphical user interface that is usable for implementing a method for providing automated monitoring of customer feedback from a variety of sources in real-time to facilitate identification and resolution of technology issues, according to an exemplary embodiment.
Figure 6:
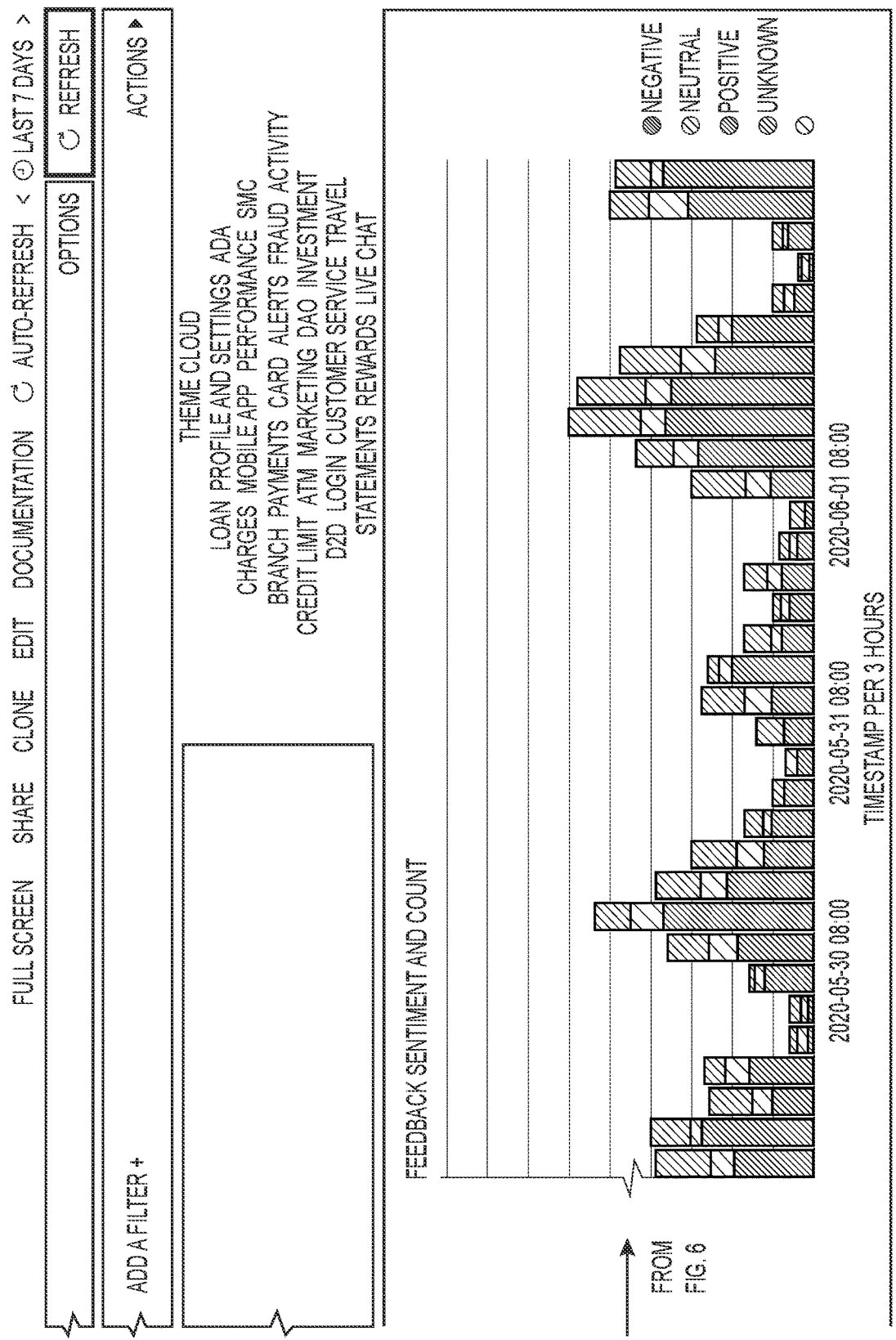

FIG. 6 is a screen shot 600 that illustrates a dashboard graphical user interface that is usable for implementing a method for providing automated monitoring of customer feedback from a variety of sources in real-time to facilitate identification and resolution of technology issues, according to an exemplary embodiment. FIG. 6 may include graphical elements such as, for example, a chart to display visual representations and a text box to display textual information. In an exemplary embodiment, the graphical elements may include a thematic map that displays correlated failure rates, a heat map that visually represents pattern information, as well as a word cloud visualization that displays platform level information such as, for example, customer comments.

As illustrated in FIG. 6, the dashboard may include the graphical elements on a graphical user interface. The graphical user interface may include input components such as, for example, a filter input component and a search input component to receive user input. The dashboard may include information panels that correspond to at least one from among an instruction panel to display textual information, a theme cloud panel that highlights keywords based on occurrence, a feedback count panel for displaying a total feedback amount at a chosen time range, a sentiment score panel to display a determined customer sentiment score, as well as a panel that includes a graphical representation of the feedback sentiment score and feedback count.

Accordingly, with this technology, an optimized process for providing automated monitoring of customer feedback from a variety of sources in real-time to facilitate identification and resolution of technology issues is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing automated customer feedback monitoring in real-time to facilitate identification and resolution of errors, the method being implemented by at least one processor, the method comprising:

ingesting, by the at least one processor via an application programming interface, data from at least one source, the data including feedback information from at least one customer, wherein the feedback information includes at least one social media complaint that relates to at least one from among a product and a service;

wherein the feedback information includes reviews from an application storefront, the application storefront corresponding to an application marketplace; and wherein the data is ingested in real-time via the application programming interface when the feedback information is published by the at least one customer;

correlating, by the at least one processor, the feedback information to a specific customer by using a customer profile identifier, the feedback information including the customer profile identifier;
attributing, by the at least one processor, the feedback information to the specific customer based on the correlating;
persisting, by the at least one processor, the data in at least one file format, the at least one file format including a tabular file format;
enriching, by the at least one processor, the persisted data with keyword information, categorization information, and label information;
appending, by the at least one processor, the enriched data with historical feedback data based on a corresponding customer and a corresponding sentiment;
filtering, by the at least one processor, the appended data based on a rating and a keyword,
    wherein the filtering narrows the feedback information to a subset that targets computing system issues;
identifying, by the at least one processor, at least one category for the filtered data based on at least one characteristic of the filtered data;
determining, by the at least one processor, whether at least one log file corresponds to the filtered data based on the identified at least one category, the at least one log file including at least one error log file that corresponds to an issue, and
when the at least one log file corresponds to the filtered data:
    correlating, by the at least one processor, the filtered data with the at least one determined log file; and
    determining, by the at least one processor, a priority level for the issue by using the correlated data and the at least one log file, and
when the at least one log file does not correspond to the filtered data:
    tagging, by the at least one processor, the filtered data;
    determining, by the at least one processor, whether the tagged data corresponds to at least one known issue by using a database exclusion table, and
    when the tagged data does not correspond to the at least one known issue:
        generating, by the at least one processor, at least one new issue tracking ticket for the tagged data, the at least one new issue tracking ticket corresponding to a new issue,
            wherein the at least one new issue tracking ticket includes a data label, an assigned owner, a title, and a description; and
            wherein the description includes information that relates to a customer, a customer comment, a rating, a timestamp, a device, a browser, a related exception, and a corresponding query;
        associating, by the at least one processor, the tagged data with the at least one new issue tracking ticket; and
        determining, by the at least one processor, a new priority level for the new issue by using the tagged data.

2. The method of claim 1, wherein the ingesting further comprises:
initiating, by the at least one processor, at least one call to the at least one source via the application programming interface;
receiving, by the at least one processor, the data from the at least one source in response to the at least one call;
sanitizing, by the at least one processor, the received data by removing at least one from among special character information and personal information; and
standardizing, by the at least one processor, the sanitized data by converting a time that is associated with the sanitized data to a coordinated universal time format.

3. The method of claim 1, wherein the filtering further comprises:
parsing, by the at least one processor, the persisted data to identify at least one linguistic element;
determining, by the at least one processor, the keyword by matching the identified at least one linguistic element with at least one predetermined keyword set; and
determining, by the at least one processor, the rating based on the identified at least one linguistic element, the rating including a level of severity that corresponds to the feedback information.

4. The method of claim 1, wherein the identifying further comprises:
assigning, by the at least one processor, at least one label that corresponds to the at least one category to the filtered data; and
apportioning, by the at least one processor, the filtered data to a support resource identifier based on the assigned at least one label.

5. The method of claim 1, wherein the at least one log file includes at least one from among a crash log file and an authentication log file.

6. The method of claim 1, wherein the determining of the priority level further comprises:
identifying, by the at least one processor, at least one service name that corresponds to the issue;
calculating, by the at least one processor, a failure rate for at least one service that is associated with the at least one service name based on the correlated data and the at least one log file that corresponds to the issue;
calculating, by the at least one processor, a customer impact count for the at least one service that is associated with the at least one service name based on the correlated data and the at least one log file that corresponds to the issue;
determining, by the at least one processor, whether the calculated failure rate is above a predetermined threshold; and
assigning, by the at least one processor, the priority level to the issue based on a result of the determining and the calculated customer impact count.

7. The method of claim 6, wherein the priority level includes at least one from among a high priority level and a critical priority level, the high priority level corresponding to a determination that the calculated failure rate is between five percent and ten percent, and the critical priority level corresponding to the determination that the calculated failure rate is more than ten percent.

8. The method of claim 6, further comprising:
updating, by the at least one processor, at least one issue tracking ticket that corresponds to the issue with information that relates to the at least one service name, the calculated failure rate, and the calculated customer impact count; and
linking, by the at least one processor, the at least one issue tracking ticket with another issue tracking ticket based on the information.

9. A non-transitory computer readable storage medium storing instructions for providing automated customer feedback monitoring in real-time to facilitate identification and resolution of errors, the storage medium comprising executable code which, when executed by a processor, causes the processor to:
  ingest, via an application programming interface, data from at least one source, the data including feedback information from at least one customer,
    wherein the feedback information includes at least one social media complaint that relates to at least one from among a product and a service;
    wherein the feedback information includes reviews from an application storefront, the application storefront corresponding to an application marketplace; and
    wherein the data is ingested in real-time via the application programming interface when the feedback information is published by the at least one customer;
  correlate the feedback information to a specific customer by using a customer profile identifier, the feedback information including the customer profile identifier;
  attribute the feedback information to the specific customer based on the correlating;
  persist the data in at least one file format, the at least one file format including a tabular file format;
  enrich the persisted data with keyword information, categorization information, and label information;
  append the enriched data with historical feedback data based on a corresponding customer and a corresponding sentiment;
  filter the persisted data based on a rating and a keyword, wherein the filtering narrows the feedback information to a subset that targets computing system issues;
  identify at least one category for the filtered data based on at least one characteristic of the filtered data;
  determine whether at least one log file corresponds to the filtered data based on the identified at least one category, the at least one log file including at least one error log file that corresponds to an issue, and
  when the at least one log file corresponds to the filtered data:
    correlate the filtered data with the at least one determined log file; and
    determine a priority level for the issue by using the correlated data and the at least one log file, and
  when the at least one log file does not correspond to the filtered data:
    tag the filtered data;
    determine whether the tagged data corresponds to at least one known issue by using a database exclusion table, and
    when the tagged data does not correspond to the at least one known issue:
      generate at least one new issue tracking ticket for the tagged data, the at least one new issue tracking ticket corresponding to a new issue,
        wherein the at least one new issue tracking ticket includes a data label, an assigned owner, a title, and a description; and
        wherein the description includes information that relates to a customer, a customer comment, a rating, a timestamp, a device, a browser, a related exception, and a corresponding query;
      associate the tagged data with the at least one new issue tracking ticket; and
      determine a new priority level for the new issue by using the tagged data.

10. The storage medium of claim 9, wherein, for the ingesting, the executable code, when executed by the processor, further causes the processor to:
  initiate at least one call to the at least one source via the application programming interface;
  receive the data from the at least one source in response to the at least one call;
  sanitize the received data by removing at least one from among special character information and personal information; and
  standardize the sanitized data by converting a time that is associated with the sanitized data to a coordinated universal time format.

11. The storage medium of claim 9, wherein, for the filtering, the executable code, when executed by the processor, further causes the processor to:
  parse the persisted data to identify at least one linguistic element;
  determine the keyword by matching the identified at least one linguistic element with at least one predetermined keyword set; and
  determine the rating based on the identified at least one linguistic element, the rating including a level of severity that corresponds to the feedback information.

12. The storage medium of claim 9, wherein, for the identifying, the executable code, when executed by the processor, further causes the processor to:
  assign at least one label that corresponds to the at least one category to the filtered data; and
  apportion the filtered data to a support resource identifier based on the assigned at least one label.

13. The storage medium of claim 9, wherein the at least one log file includes at least one from among a crash log file and an authentication log file.

14. The storage medium of claim 9, wherein, for the determining of the priority level, the executable code, when executed by the processor, further causes the processor to:
  identify at least one service name that corresponds to the issue;
  calculate a failure rate for at least one service that is associated with the at least one service name based on the correlated data and the at least one log file that corresponds to the issue;
  calculate a customer impact count for the at least one service that is associated with the at least one service name based on the correlated data and the at least one log file that corresponds to the issue;
  determine whether the calculated failure rate is above a predetermined threshold; and
  assign the priority level to the issue based on a result of the determining and the calculated customer impact count.

15. The storage medium of claim 14, wherein the priority level includes at least one from among a high priority level and a critical priority level, the high priority level corresponding to a determination that the calculated failure rate is between five percent and ten percent, and the critical priority level corresponding to the determination that the calculated failure rate is more than ten percent.

16. The storage medium of claim 14, wherein, when executed by the processor, the executable code further causes the processor to:
  update at least one issue tracking ticket that corresponds to the issue with information that relates to the at least one service name, the calculated failure rate, and the calculated customer impact count; and link the at least one issue tracking ticket with another issue tracking ticket based on the information.

\* \* \* \* \*